(12) United States Patent
Paleari et al.

(10) Patent No.: US 11,796,890 B2
(45) Date of Patent: Oct. 24, 2023

(54) TRANSPORT SYSTEM FOR A LASER BEAM

(71) Applicant: QUANTA SYSTEM S.P.A., Milan (IT)

(72) Inventors: Fabio Paleari, Milan (IT); Luca Casonato, Malnate (IT); Marco Tagliaferri, Florence (IT)

(73) Assignee: QUANTA SYSTEM S.P.A., Milan (IT)

( * ) Notice: Subject to any disclaimer, the term of this patent is extended or adjusted under 35 U.S.C. 154(b) by 0 days.

(21) Appl. No.: 17/290,412

(22) PCT Filed: Oct. 24, 2019

(86) PCT No.: PCT/IB2019/059121
§ 371 (c)(1),
(2) Date: Apr. 30, 2021

(87) PCT Pub. No.: WO2020/089744
PCT Pub. Date: May 7, 2020

(65) Prior Publication Data
US 2021/0356840 A1    Nov. 18, 2021

(30) Foreign Application Priority Data
Nov. 2, 2018   (IT) .................. 102018000010009

(51) Int. Cl.
| | | |
|---|---|---|
| *G02F 1/39* | (2006.01) | |
| *G02B 27/28* | (2006.01) | |
| *G02F 1/35* | (2006.01) | |
| *G02F 1/355* | (2006.01) | |
| *G02F 1/37* | (2006.01) | |
| *H01S 3/00* | (2006.01) | |

(52) U.S. Cl.
CPC ............. *G02F 1/39* (2013.01); *G02B 27/286* (2013.01); *G02F 1/3503* (2021.01); *G02F 1/3553* (2013.01); *G02F 1/37* (2013.01); *G02F 2203/03* (2013.01); *G02F 2203/24* (2013.01); *H01S 3/0071* (2013.01); *H01S 3/0092* (2013.01)

(58) Field of Classification Search
None
See application file for complete search history.

(56) References Cited

U.S. PATENT DOCUMENTS

| | | | |
|---|---|---|---|
| 5,181,211 A * | 1/1993 | Burnham .................. | G02F 1/39 372/98 |
| 5,636,238 A | 6/1997 | Mohebati et al. | |
| 5,698,120 A | 12/1997 | Kurosawa et al. | |
| 6,026,112 A | 2/2000 | Hecht et al. | |

(Continued)

FOREIGN PATENT DOCUMENTS

WO    9951161 A1    10/1999

*Primary Examiner* — Rhonda S Peace
(74) *Attorney, Agent, or Firm* — Dickinson Wright PLLC; Andrew D. Dorisio

(57) ABSTRACT

A wavelength conversion system comprising a transport system for a laser beam comprising: a circular polarization laser beam; an articulated arm comprising a mirror at each of its joints, arranged at 45° with respect to said laser beam; each of said mirrors having a phase shift between the reflected components of less than 10°; means for converting said laser beam from circular polarization to linear polarization and providing a linear polarization output laser beam; a non-linear converter for converting the wavelength of said output laser beam to linear polarization.

9 Claims, 3 Drawing Sheets

(56) References Cited

U.S. PATENT DOCUMENTS

Figure 1:
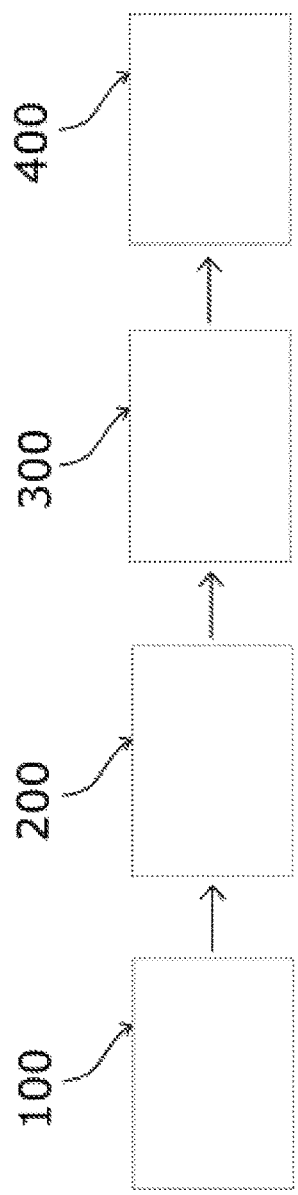

| | | | | |
|---|---|---|---|---|
| 10,241,345 B2* | 3/2019 | Shang | .................... | A61B 18/20 |
| 2011/0180729 A1* | 7/2011 | Kafka | .................. | H01S 3/0092 |
| | | | | 250/492.1 |
| 2011/0306955 A1* | 12/2011 | Thorhauge | ........... | A61B 18/203 |
| | | | | 606/9 |
| 2012/0113994 A1* | 5/2012 | Georges | ................ | H01S 3/1086 |
| | | | | 372/3 |
| 2013/0043392 A1* | 2/2013 | Mildren | .................... | H01S 3/30 |
| | | | | 250/341.1 |
| 2016/0336715 A1* | 11/2016 | Mildren | .................. | H01S 3/163 |
| 2018/0074338 A1* | 3/2018 | Shang | .................... | A61B 18/20 |
| 2021/0356840 A1* | 11/2021 | Paleari | ..................... | G02F 1/39 |

\* cited by examiner

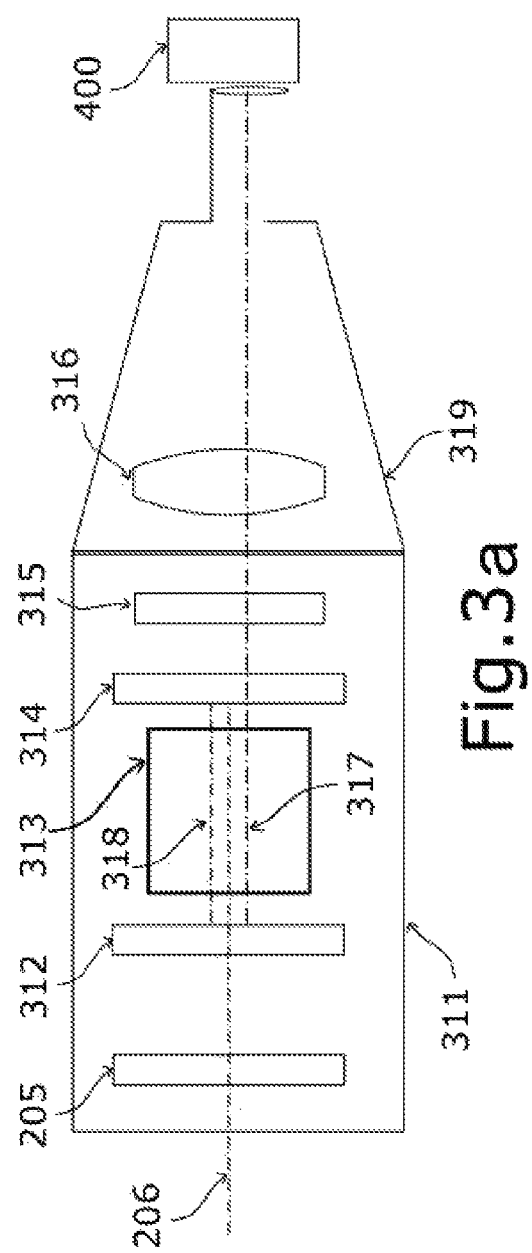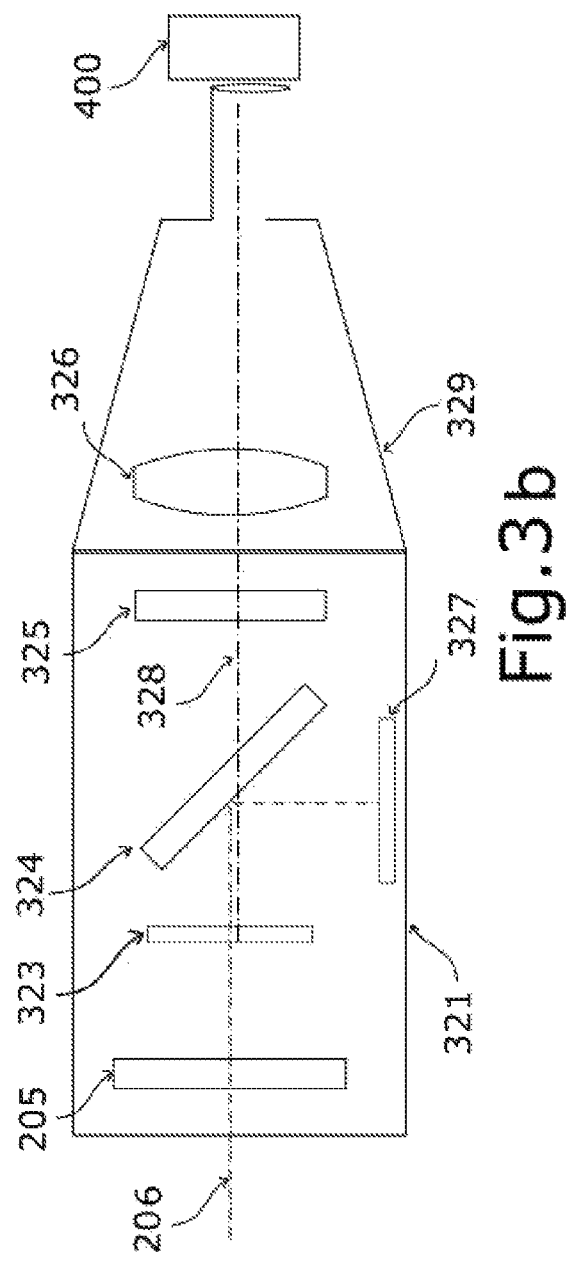

TRANSPORT SYSTEM FOR A LASER BEAM

The present invention refers to a transport system for a laser beam and more in particular a wavelength conversion system comprising a transport system for a laser beam.

BACKGROUND

For dermatological applications (pigmented lesions, green tattoos and photorejuvenation of the skin), it is necessary to work with a laser system with wavelength comprised between 660 nm and 790 nm able to produce energy pulses lower than 1 J and higher than 1 mJ, and with pulse duration of less than one nanosecond. It is known that the laser system with wavelength in the range 660 nm-790 nm is optimal for the treatment of pigmented lesions. In fact, in this wavelength range the contrast between melanin and haemoglobin contained in the biological tissue is maximized. This guarantees the effectiveness of the treatment and a reduction of the side effects. Furthermore, it is known that the laser systems for dermatological application should have applied parts, such as handpieces, which allow delivery of the laser radiation directly onto the skin of the patient.

Currently, in medical and/or industrial laser systems with high peak power, an articulated arm is typically used to guide the primary laser beam emitted by the source to the surface or to the object to be treated (EP 0879493, US 2006259021). Said articulated arms are composed of a series of rectilinear segments connected at 90° by rotatable joints. A dielectric mirror with high reflectivity at the wavelength of the primary beam is positioned in each joint so as to reflect the primary laser beam along the various segments. The primary laser beam strikes the surface of each mirror at 45°. Typically, said laser machines emit primary laser beams having one or two wavelengths, three in the case of more complex and costly machines.

To extend the number of wavelengths that can be used by the operator during the treatment, it is possible to add new sources within the device, but this entails an increase in the dimensions, costs and complexity of the device and the number of wavelengths at which the dielectric mirrors of the articulated arm are required to possess high reflectivity, with consequent reduction in the damage threshold of the optics. The reduction in the damage threshold has the undesired effect of reducing the optical energy performances of the system.

Another solution consists in connecting optical handpieces to the output end of the articulated arm (U.S. Pat. No. 5,636,238). Said handpieces contain laser sources based on solid dyes or titanium-sapphire. The primary laser beam emitted by the device is absorbed by the active means present inside the handpiece with the consequence that the primary laser beam is re-emitted at a different wavelength by amplification of the spontaneous emission or laser emission. The handpiece can include other optics such as lenses for modelling the primary laser beam, mirrors at appropriate wavelengths to enclose the active means in a resonator, lenses or other optical elements for modelling the secondary laser beam emitted by the dye. The dyes are amorphous materials, the absorption of which does not depend on the polarization of the pump radiation. It is known to a person skilled in the art that dye handpieces have some advantages, including facility of use and the number of wavelengths that can be generated; but the big drawback is also known, which consists in the fact that they are devices subject to wear and are suspected carcinogens. In fact, after a few thousand single laser pulses their performance deteriorates and after tens of thousands of single laser pulses they must be replaced or regenerated.

A handpiece not based on the use of consumables is a titanium sapphire laser system pumped by the second harmonic of a resonator in Nd:YAG, as described in U.S. Pat. No. 5,636,238. The limit of this solution consists in the fact that absorption of the titanium depends partly on the polarization of the pump. Using a pump beam with circular polarization (as described in U.S. Pat. No. 5,636,238), the absorption is not optimized.

Non-linear crystals such as, for example, but not limited to KTP (potassium titanyl phosphate), LBO (lithium triborate), BBO (beta barium borate), KGW (potassium gadolinium tungstate), LiNbO3 (lithium niobate) if used below the damage thresholds, can reach one million single laser pulses without significant deterioration in performance. In order to be able to use non-linear crystals as frequency converters, the primary laser beam emitted from the articulated arm must have a known polarization and independent of the position of the articulated arm. However, with the articulated arms currently in use, this does not occur for two reasons. Typically, the primary laser beam enters the articulated arm with linear polarization (EP 0879493). The output plane of polarization, however, is not immediately known since it depends on the particular position of the articulated arm. By moving the arm in different positions, the plane of polarization consequently rotates. Furthermore, the dielectric mirrors typically have a different phase shift value between the reflected components "p" and "s". At each reflection, the polarization of the beam reflected by the mirror depends on the polarization of the incident beam and the orientation of the mirror. The polarization at the output of the articulated arm will therefore be in general elliptical, difficult to control and dependent on the position of the articulated arm. Since the non-linear crystals require well-defined polarization of the pump beam in order to function, they cannot be used at the output of a normal articulated arm.

It is known to a person skilled in the art that an optical parametric oscillator (OPO) with high energy (greater than 5 mJ) able to convert a short pulse (less than 30 ns) at a primary wavelength into a pulse of similar duration at a secondary wavelength, generates a beam of the latter with low spatial quality. This means that it is difficult to manage if the OPO is positioned upstream of an articulated arm. Furthermore, it is also known that these non-linear converters require a given polarization to function efficiently, and this is impossible with the standard transmission systems.

SUMMARY

The object of the present invention is to provide a wavelength conversion system comprising a transport system for a laser beam maintaining a known polarization inside an articulated arm.

In accordance with the present invention, said objects and others still are achieved by a wavelength conversion system comprising a transport system for a laser beam comprising: a laser beam with circular polarization; an articulated arm comprising a mirror at each of its joints, positioned at 45° with respect to said laser beam; each of said mirrors having a phase shift of less than 10° between the reflected components; means for converting said laser beam from circular polarization to linear polarization and providing an output laser beam with linear polarization; a non-linear converter for converting the wavelength of said output laser beam to linear polarization.

Said objects are furthermore achieved by a wavelength conversion method comprising a transport system for a laser beam comprising the steps of: providing a laser beam with circular polarization; an articulated arm comprising a mirror at each of its joints, arranged at 45° with respect to said laser beam; each of said mirrors having a phase shift of less than 10° between the reflected components; converting said laser beam from circular polarization to linear polarization; providing an output laser beam with linear polarization; converting the wavelength of said output laser beam to linear polarization by means of a non-linear wavelength converter.

Further characteristics of the invention are described in the dependent claims.

This solution offers various advantages compared to the solutions of the known art.

The solution provides a laser transport system that maintains the polarization.

In fact, the present solution guarantees a known polarization independent of the position of the arm.

The articulated arm is composed of different mirrors (for example dielectric mirrors with low phase shift). These allow the state of polarization to be maintained and do not change the phase of the two polarizations. In this way there are no limits to the linear length of the articulated arm.

The device of the present invention solves the problem of handpieces based on the use of dyes, while maintaining the advantages thereof.

The device of the present invention solves the problem of management of the beams with low spatial quality produced by the OPO's, since it is positioned downstream of the articulated arm, inside a handpiece.

It is therefore possible to connect a handpiece containing a wavelength converter based on the use of a non-linear crystal to the transport system for a laser beam that maintains the polarization. Said handpiece can be easily connected to the transport system and does not require optical alignment by the operator; this constitutes the unique characteristic of our invention. This solution overcomes the limit of the known art in which all the wavelengths, produced by means of non-linear effects, are generated upstream of the articulated arm.

The primary laser beam acts as a pump beam for the non-linear crystal, which converts the primary laser beam into a secondary laser beam with a different wavelength through non-linear optical processes such as, for example, but not limited to, second harmonic generation, third harmonic generation, sum frequency generation, difference frequency generation, parametric generation, parametric amplification, parametric oscillation, stimulated Raman scattering. The configuration and the arrangement of the optical elements of the wavelength converter depend on the crystal and the non-linear process used.

Typically, the pump laser consists of a lamp pumped solid state laser. Said lasers are generally characterized by a beam with known linear polarization.

The polarization-maintaining delivery system is composed as follows: at the input of the articulated arm a first lambda quarter-wave plate is arranged orientated such as to convert the pump laser polarization from linear to circular. If the pump beam already has circular polarization, said first plate is omitted. If the pump beam instead has elliptical polarization, a lambda quarter-wave plate and a lambda half-wave plate, appropriately orientated so as to produce circular polarization, are arranged at the input of the articulated arm. It is possible to obtain the same effect without plates if the output mirror in the articulated arm has a phase difference of 90° between the reflected components "p" and "s" and is appropriately orientated.

The 45° mirrors of the articulated arm are purposely designed in order to obtain high reflectivity at the wavelength of the laser that will be used as a pump and so as to have a minimum phase difference between the reflected components p and s, ideally below 5°. In this way, the reflected beam has a polarization almost identical to the incident beam, whatever it is. In particular, at each reflection, the polarization of the pump laser is maintained almost circular. At the arm output, a second lambda quarter-wave plate is arranged which converts the circular polarization of the pump beam into linear polarization. The plane of linear polarization at the output does not depend on the particular position of the articulated arm, but only on the position of the optical axis of the second plate.

At the arm output, a connection device is provided which allows fitting/removal of the wavelength converter. Alternatively, the second lambda quarter-wave plate can be omitted from the articulated arm and incorporated inside the wavelength converter.

BRIEF DESCRIPTION OF THE DRAWING FIGURES

Figure 2:
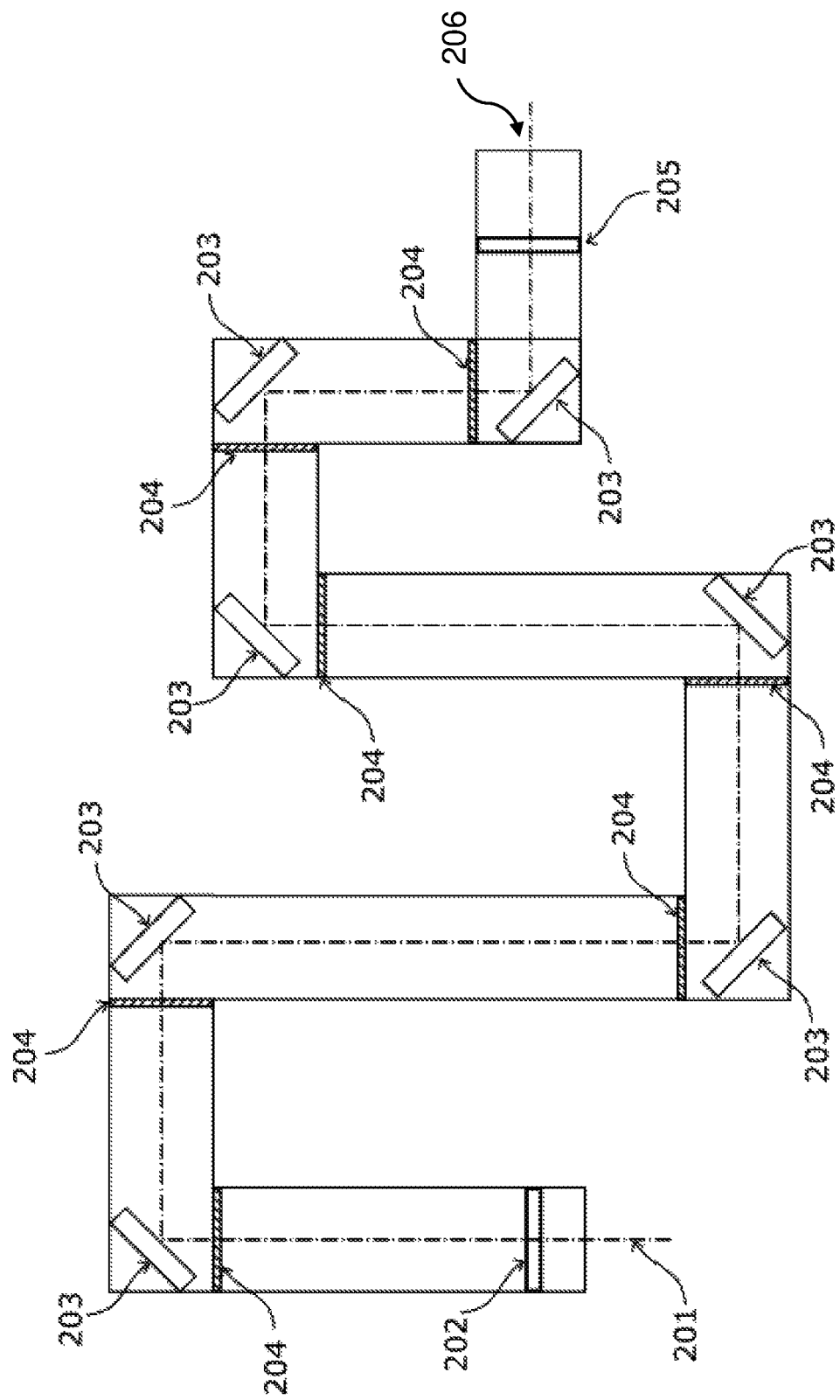

The characteristics and advantages of the present invention will be evident from the following detailed disclosure of a practical embodiment thereof, illustrated by way of non-limiting example in the attached drawings, in which:

FIG. 1 schematically shows a block diagram of a wavelength conversion system comprising a transport system for a laser beam, in accordance with the present invention;

FIG. 2 shows a detail of the polarization-maintaining articulated arm, in accordance with the present invention;

FIG. 3.a shows a non-linear wavelength converter, which requires a known polarized beam, based on a parametric oscillator (OPO), in accordance with the present invention;

FIG. 3.b shows a non-linear wavelength converter, which requires a known polarized beam, based on frequency doubling (SHG), in accordance with the present invention;

FIG. 3.c shows a non-linear wavelength converter, which requires a known polarized beam, based on a resonator which exploits stimulated Raman scattering (SRS), in accordance with the present invention.

DETAILED DESCRIPTION

Referring to the attached figures, a transport system for a laser beam, in accordance with the present invention, comprises a source 100 of the primary laser beam inside the machine. Said source can be, for example, a solid-state cavity operated, for example, in free-running, Q-switch or mode-lock mode, like a one-step, two-step or regenerative amplification system or similar. Said pulses are coupled to a polarization-maintaining articulated arm 200. At the output of said articulated arm, it is possible to connect a non-linear wavelength converter 300. The laser beam generated by the converter is therefore directed onto the object to be treated 400.

In a particular embodiment, the source 100 consists in a lamp-pumped Nd:Yag resonator injected with an appropriate seed (see for example US2018034231). Said resonator allows the generation of pulses at 1064 nm with a FWHM (Full Width Half Maximum) duration of 450 ps and energy per pulse of 800 mJ. The second harmonic of said pulses consists in pulses with FWHM duration of 370 ps and energy 400 mJ. Said resonator can also be operated in normal Q-switch mode, producing pulses at 1064 nm of 800 mJ and approximately 6 ns duration. The second harmonic consists in pulses at 532 nm, 400 mJ and approximately 6 ns duration.

In FIG. 2, the number 201 indicates the primary laser beam generated by the source 100. Said laser beam typically has linear polarization. The number 202 indicates a first lambda quarter-wave plate. Said first plate is orientated with the optical axis so as to convert the polarization of the beam 201 from linear to circular. If the beam 201 already has circular polarization, said first plate is omitted. The number 204 indicates the joints that enable the various sections of the articulated arm to rotate around the propagation axis of the laser beam. At each joint a mirror 203 is positioned, arranged at 45° with respect to the incident beam 201.

Said mirror has a coating designed to have high reflectivity at the wavelengths of the primary laser beam and so as to have a phase shift between the reflected components p and s such that |PRs−PRp|<+/−10°+n*180° where PRs and PRp indicate the phases of the reflected components p and s, with n an integer greater than or equal to 0. In this way, at each reflection, the laser beam maintains almost circular polarization whatever the position of the articulated arm. Based on the phase difference value, the effect of the mirrors on the polarization is either null or is of conversion from right to left circular polarization and vice versa at every reflection. Given the number of mirrors in the arm, by way of non-exhaustive example 7, as in FIG. 2, if they satisfy the limit on the phase shift reported above, the polarization at the output is known and is circular.

With this application 3 to 10 mirrors can be used.

With a second plate 205 the beam is converted from circular polarization to linear polarization. The polarization plane downstream of the plate depends only on the optical axis of the plate 205 itself. Maintenance of the polarization is the innovative characteristic of our device. By appropriately choosing the reflectivity specifications and phase shift of the plate and mirrors, said arm can function at any wavelength of the light spectrum. The second plate 205 can also be omitted from the articulated arm 200. In this case, said second plate will be integrated in the non-linear converter 300.

In a particular embodiment, the mirrors of said arm have high reflectivity (R>98%) at 1064 nm and 532 nm. They also have a phase difference between the reflected components p and s at 532 nm of less than 3°. The phase difference at 1064 nm is not specified. The plate 202 is a lambda quarter-wave plate at 532 nm orientated with optical axis at 45° with respect to the polarization plane of the beam 201, so as to convert the polarization of the beam at 532 nm from linear to circular. The delay of the plate 202 at 1064 nm is not specified. The plate 205 is not incorporated in the arm, but in the converter 300.

Figure 3C:
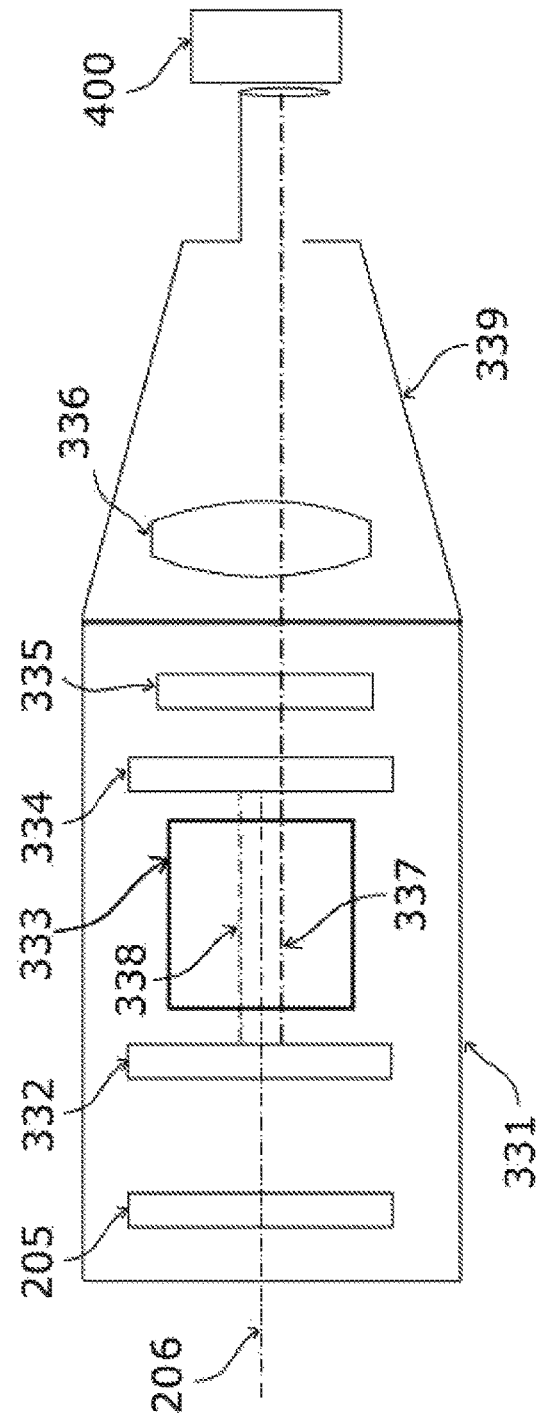

FIGS. 3a, 3b and 3c show three different possible embodiments of handpieces 311, 321 and 331, containing inside them a non-linear frequency converter.

The number 206 indicates the laser beam emitted from the polarization-maintaining arm 200. Said handpieces are attached to the articulated arm by means of any coupling system (not shown here). The number 205 indicates the second lambda quarter-wave plate which allows linear polarization to be obtained from circular polarization. If said plate is already incorporated in the arm 200, it must be omitted from the handpiece.

The handpiece 311 converts the wavelength of the beam 206 into a longer wavelength 317 by means of a parametric oscillator (OPO). Said OPO consists of a crystal 313, a first mirror 312 and a second mirror 314. Said crystal is cut at an angle such as to produce from a pump beam 206, a signal beam 317 of the desired wavelength, and an idler beam 318 of appropriate wavelength given by the laws of conservation of energy. The reflectivities of said mirrors 312 and 314 are chosen based on the particular configuration of the OPO chosen (one-step, two-step, resonant at one or both the wavelengths generated). In another embodiment of the handpiece, said mirrors 312 and 314 are directly coated on the faces of the crystal 313. Generally, a given intensity profile, typically round and uniform, is desired on the target 400. To obtain this, it is possible to use the combination of a diffractive element 315 and a lens with appropriate focal length 316. In a possible alternative, 315 is an array of microlenses and 316 a lens with appropriate focal length. Said lens 316 is preferably contained in a removable and interchangeable part 319 of the handpiece. With various interchangeable parts 319, each one having inside it a lens 316 with different focal length, it is possible to obtain profiles with different intensity and dimension based on the focal length selected. In another embodiment of the handpiece, said lens 316 can be incorporated in the handpiece 311. In another embodiment of the handpiece, said lens 316 can be replaced by a system of movable lenses such as to form a zoom type optical system.

In a particular embodiment, the beam 206 consists of pulses at 532 nm with FWHM duration of 370 ps, energy 300 mJ and circular polarization. The plate 205 is incorporated in said handpiece and orientated so as to convert the circular polarization of the beam 206 into linear polarization. The crystal 313 consists of a KTP crystal with length between 10 and 30 mm and appropriate aperture, cut to obtain phase matching of type 1 at the angles θ=54.5° and φ=0° to generate a signal at 755 nm and an idler at 1801 nm. The mirror 312 is HR (high reflectivity) at 755 nm and 1801 nm, AR (anti reflective) at 532 nm. The mirror 314 is HR at 532 nm and 1801 nm, AR at 755 nm. The particular characteristic of an OPO with such a short cavity is that it generates signal pulses with duration in the order of hundreds of picoseconds. In fact, pulses are generated up to 140 mJ and 450 ps FWHM at 755 nm.

The diffractive element 315 is designed so as to produce in the focus of the lens 316 with focal length 30 mm a uniform round spot with diameter of two millimetres. With this spot, peak fluences and intensities are reached useful for treating, for example, selectively and effectively, pigmented skin lesions of the patient 400.

In the configuration shown, the crystal is maintained fixed; however, it is possible to adjust the wavelengths 318 and 317 in a continuous manner by rotating the crystal, subject to having mirrors 312 and 314 with HR and AR coating with sufficient band width. For example, it is possible to rotate the crystal by 5.8° to obtain a beam 317 at 694 nm and a beam 318 at 2279 nm.

The number 321 indicates a second possible handpiece. The number 323 indicates a non-linear crystal appropriately cut and orientated so as to generate the second harmonic 328 of the beam 206. According to the crystal chosen, it may be necessary to heat said crystal to a given temperature, by means of a thermostatting system not shown here, so as to obtain an efficient conversion process. The number 324 indicates a dichroic mirror with HR coating relative to the beam 206 and AR coating relative to the beam 328. It is not necessary to insert said dichroic mirror if both beams are to be used simultaneously on the target 400. The number 327 indicates an absorber of the beam 206. The number 325 indicates a diffractive optical element and 326 a lens with appropriate focal length to produce on the target 400 a spot with dimension and profile of the desired intensity. Said lens 326 is preferably contained in a removable and interchangeable part 329 of the handpiece. With various interchangeable parts 329, each having inside it a lens 326 with different focal length, it is possible to obtain profiles with different intensity and dimension based on the selected focal length. Said laser beam is particularly useful in the treatment of tattoos with particular colours. A possible advantage of second harmonic generation in the handpiece instead of in the machine consists in being able to build a more compact laser machine at the sole wavelength of 1064 nm and connecting said handpiece as an accessory. By using one single wavelength it is technically simpler to construct said mirrors of the arm.

The number 331 indicates a third possible embodiment of the handpiece. The handpiece 331 converts the wavelength of the beam 206 into a longer wavelength 337 by means of the stimulated Raman effect. The number 333 indicates an appropriate Raman crystal enclosed by a first mirror 332 and a second mirror 334. Said crystal is cut at such an angle and orientated so as to produce from the pump beam 206 its first Stokes wavelength 338. Said first Stokes wavelength resonates between the two mirrors and is converted by the same crystal into the second Stokes wavelength 337. Said crystal is enclosed by a first mirror 332 and by a second mirror 334. Said mirror 332 has an AR coating relative to the beam 206, and HR coating relative to the beams 338 and 337. Said mirror 334 has an HR coating relative to the beam 206 and 338, and AR coating or coating with a certain reflectivity relative to the beam 337. Generally, a given intensity profile is desired, typically round and uniform, on the target 400. To obtain this, it is possible to use the combination of a diffractive element 335 and a lens with appropriate focal length 336. Said lens 336 is preferably contained in a removable and interchangeable part 339 of the handpiece. With various interchangeable parts 339, each having inside it a lens 336 with different focal length, it is possible to obtain profiles of different intensity and dimension based on the selected focal length. In a particular embodiment, the beam 206 consists of pulses at 532 nm with duration of approximately 10 ns and energy 400 mJ. The crystal 333 consists of a KGW crystal of appropriate length. The first Stokes wavelength 338 will have a wavelength of 558 nm while the second Stokes wavelength 337 will have a wavelength of 588 nm, in the yellow region of the spectrum. Typical conversion efficiencies are 60% for the first Stokes wavelength and 20% for the second Stokes wavelength.

The system thus conceived is subject to numerous modifications and variations, all falling within the scope of the inventive concept; furthermore, all the details can be replaced by technically equivalent elements.

The invention claimed is:

1. A wavelength conversion system comprising a transport system for a laser beam comprising:
    a first lambda quarter-wave plate adapted to convert a polarization of linear beam from linear polarization laser generator at 532 nm to a circular polarization laser beam;
    an articulated arm comprising a mirror at each of its joints, arranged at 45° with respect to said laser beam; each of said mirrors having a phase shift between the reflected components of less than 10°;
    a second lambda quarter-wave plate for converting said laser beam from circular polarization to linear polarization and providing a linear polarization output laser beam;
    a non-linear converter for converting the wavelength of said output laser beam from a first wavelength to a second wavelength;
    wherein the non-linear converter is a parametric oscillator with a KTP crystal, and wherein the KTP crystal is rotatable so as to cause adjustment of the wavelength of the output laser beam;
    wherein the KTP crystal has a length between 10 and 30 mm and includes an aperture, cut to obtain type 1 phase matching at angles of $\theta=54.5°$ and $\varphi=0°$ to generate a signal at 755 nm and an idler at 1801 nm.

2. The system according to claim 1 characterized in that said circular polarization laser beam is produced by a linear polarization laser generator followed by a first lambda quarter-wave plate.

3. The system according to claim 1 characterized in that said circular polarization laser beam is produced by an elliptical polarization laser generator followed by a first lambda quarter-wave plate and a second lambda half-wave plate.

4. The system according to claim 1 characterized in that said second lambda quarter-wave plate for converting said laser beam from circular polarization to linear polarization is arranged at the output of said articulated arm.

5. The system according to claim 1 characterized in that said non-linear converter comprises a first mirror arranged upstream of said crystal and a second mirror arranged downstream of said crystal.

6. The system according to claim 1 characterized in that said non-linear converter is arranged in a handpiece.

7. The system according to claim 1, wherein the articulating arm comprises seven joints.

8. The system according to claim 1, wherein the articulating arm comprises eight segments.

9. A wavelength conversion method comprising a transport system for a laser beam comprising the steps of:
    providing an elliptical polarization generator adapted to emit a laser beam with an elliptical polarization;
    providing an articulated arm comprising a mirror at each of its joints, arranged at 45° with respect to said laser beam, each of said mirrors having a phase shift between the reflected components of less than 10°;
    providing a first lambda quarter-wave plate and a lambda half-wave plate at an input of the articulated arm for converting said laser beam from elliptical polarization to circular polarization;
    providing a second lambda quarter-wave plate at an output of the articulated arm for converting the circular polarization to a linear polarization output laser beam; and
    converting the wavelength of said linear polarization output laser beam by means of a non-linear wavelength converter, wherein the non-linear wavelength converter is a parametric oscillator with a KTP crystal, wherein the KTP crystal is rotatable so as to cause adjustment of the wavelength of the output laser beam, and wherein the KTP crystal has a length between 10 and 30 mm and includes an aperture, cut to obtain type 1 phase matching at angles of $\theta=54.5°$ and $\varphi=0°$ to generate a signal at 755 nm and an idler at 1801 nm.

* * * * *